United States Patent [19]

Tabb

[11] Patent Number: 4,708,988
[45] Date of Patent: Nov. 24, 1987

[54] PROCESS FOR DYNAMICALLY PARTIALLY GELLING FLUOROELASTOMERS

[75] Inventor: David L. Tabb, Wilmington, Del.

[73] Assignee: E. I. Du Pont de Nemours and Company, Wilmington, Del.

[21] Appl. No.: 750,181

[22] Filed: Jul. 1, 1985

[51] Int. Cl.$^4$ .................. C08F 8/06; C08F 114/22
[52] U.S. Cl. .................. 525/194; 525/193; 525/326.3; 525/387; 526/249; 526/254; 526/255
[58] Field of Search ............ 525/326.3, 387, 194, 525/193, 197, 198, 199; 526/255, 249, 254; 528/502; 264/209.6

[56] References Cited

U.S. PATENT DOCUMENTS

| Re. 32,028 | 11/1985 | Fischer | 525/198 X |
|---|---|---|---|
| 3,825,510 | 7/1974 | Yamamoto et al. | 525/387 X |
| 3,851,018 | 11/1974 | Kelly | 260/900 |
| 4,035,565 | 7/1977 | Apotheker et al. | 525/387 X |
| 4,115,481 | 9/1978 | Finlay et al. | 260/900 |
| 4,271,275 | 6/1981 | MacLachlan | 525/112 |
| 4,299,958 | 11/1981 | Apotheker | 544/221 |
| 4,501,869 | 2/1985 | Tatemoto et al. | 525/387 X |

Primary Examiner—Joseph L. Schofer
Assistant Examiner—F. M. Teskin

[57] ABSTRACT

An extrudable fluoroelastomer comprising a gelled fluoroelastomer having units of vinylidene fluoride and units of at least one other fluorine-containing monomer copolymerizable with vinylidene fluoride, said monomer containing from 2–7 carbon atoms, containing no bromine atoms and containing at least as many flourine atoms as carbon atoms, said fluoroelastomer having been simultaneously mixed, sheared and gelled by an organic peroxide gelling agent to a gel content of from about 15–80% by weight, measured in methyl ethyl ketone at 80° C.

6 Claims, No Drawings

PROCESS FOR DYNAMICALLY PARTIALLY GELLING FLUOROELASTOMERS

BACKGROUND OF THE INVENTION

This invention relates to a process for dynamically partially gelling fluoroelastomers and to compositions comprising the partially gelled fluoroelastomers with ungelled fluoroelastomers.

Fluoroelastomer compositions are difficult to process efficiently. When uncured fluoroelastomers are extruded through a die opening to make a shaped article the fluoroelastomers have a strong tendency to swell after passing through the die orifice resulting in a shaped article which is much larger than the size of the die opening. Large die swell makes it very difficult to extrude articles with intricate cross-sections. The amount of pressure required to extrude fluoroelastomer compositions through a die orifice can be substantial, especially when a die with a small opening must be used due to the large amount of die swell that occurs. Furthermore, when uncured fluoroelastomers are extruded, frequently, the surface of the extruded article has a rough appearance unless special measures are taken, such as the addition of a wax-type extrusion aid and selection of extrusion equipment that can provide high extrudate temperatures of the order of 120° C.

The present invention provides a process for making partially gelled fluoroelastomers dynamically, said fluoroelastomers having improved processing characteristics. The fluoroelastomers of this invention when extruded through a die orifice show a substantial reduction in die swell normally associated with fluoroelastomers. Further, the fluoroelastomers of the present invention when extruded have smoother surface characteristics than like fluoroelastomers.

SUMMARY OF THE INVENTION

The present invention is directed to a process for the manufacture of a processable gelled fluoroelastomer which comprises simultaneously mixing, shearing and gelling (i.e., dynamically partially gelling), in an internal mixer, a fluoroelastomer comprising interpolymerized units of vinylidene fluoride and units of at least one other fluorine-containing monomer copolymerizable with vinylidene fluoride, said monomer containing 2-7 carbon atoms, containing no bromine atoms and containing at least as many fluorine atoms as carbon atoms, in the presence of an organic peroxide gelling agent for the fluoroelastomer for a time and at a temperature sufficient to decompose the peroxide gelling agent, said peroxide gelling agent added to the fluoroelastomer in an amount to gel the fluoroelastomer to a gel content of from about 15-80% by weight, preferably about 25-75% by weight, measured in methyl ethyl ketone (MEK) at 80° C., and recovering the gelled fluoroelastomer.

The resulting product is an extrudable gelled fluoroelastomer having interpolymerized units of vinylidene fluoride and units of at least one other fluorine-containing monomer copolymerizable with vinylidene fluoride, said monomer containing from 2-7 carbon atoms, containing no bromine atoms and containing at least as many fluorine atoms as carbon atoms, said fluoroelastomer having been simultaneously mixed, sheared and gelled by an organic peroxide gelling agent to a gel content of from 15-80%, preferably 25-75%, by weight, measured in methyl ethyl ketone at 80° C.

Preferably, the fluoroelastomer that is gelled, and the resulting product, is a blend of fluoroelastomers added to the internal mixer wherein the fluoroelastomers of the blend comprise units of vinylidene fluoride and hexafluoropropylene and at least one fluoroelastomer of the blend contains units from a bromine-containing olefin. Optionally the fluoroelastomer can contain tetrafluoroethylene units. Usually the bromine-containing olefin is bromodifluoroethylene, bromotrifluoroethylene and, especially, 4-bromo-3,3,4,4-tetrafluorobutene-1. It is advantageous to gel fluoroelastomers of the present invention that contain units of a bromine-containing olefin with peroxide because such fluoroelastomers when treated with an organic peroxide gelling agent attain a higher gel content with the same amount of peroxide and coagent as fluoroelastomers that do not have units of a bromine-containing olefin cure site.

The resulting partially gelled fluroelastomers when extruded have improved processing characteristics, as indicated by a reduction in die swell and, usually, the surfaces of the extruded articles are smoother than the surfaces of chemically similar extruded ungelled fluoroelastomers.

The dynamically gelled fluoroelastomers can be extruded alone or the gelled fluoroelastomer can be blended with ungelled fluoroelastomers to make a composition that can be readily and efficiently extruded. By ungelled fluoroelastomer is meant a fluoroelastomer having a gel content not greater than about 5% by weight measured in methyl ethyl ketone at 80° C. The gel content of the resulting blended fluoroelastomer composition is from about 15-80% by weight, preferably 25-55%, by weight. One can achieve the desired gel content of the fluoroelastomer composition by adjusting the quantity of the dynamically gelled fluoroelastomer in the blend, by adjusting the gel content of the gelled fluoroelastomer, or by a combination of both techniques. Whether used by itself or blended with an ungelled fluoroelastomer, the gelled fluoroelastomer can contain curing systems based on organic peroxides, polyamines, and polyols. The same beneficial results of improved processing behavior are found in the blended fluoroelastomers, which contain the dynamically partially gelled fluoroelastomers of the present invention and an ungelled fluoroelastomer, as are found in the unblended dynamically gelled fluoroelastomers. The gelled fluoroelastomer compositions of this invention can be used in applications normally associated with fluoroelastomers such as cord for the manufacture of O-rings and gaskets, especially those articles having intricate cross-sections.

DETAILED DESCRIPTION OF THE INVENTION

The fluoroelastomers that are dynamically partially gelled by organic peroxides include polymers containing interpolymerized units of vinylidene fluoride with units of at least one other fluorine-containing monomer copolymerizable with vinylidene fluoride, said monomer containing from 2-7 carbon atoms, containing no bromine atoms and containing at least as many fluorine atoms as carbon atoms, e.g., hexafluoropropylene, pentafluoropropylene, etc. By dynamically partially gelling is meant gelling the polymer while, at the same time, the polymer is being mixed and sheared, as contrasted to a static procedure that does not employ mixing and shearing. The fluoroelastomers used in this invention are well known in the art, and most are commercially available. Representative fluoroelastomers include polymers containing units of vinylidene fluoride and units of hexafluoropropylene optionally with a bromine-containing olefin; polymers containing units of vinylidene fluoride, units of hexafluoropropylene and units of tetrafluoroethylene; polymers containing units of vinylidene fluoride, units of tetrafluoroethylene and units of pentafluoropropylene; polymers containing units of vinylidene fluoride, units of perfluoroalkyl perfluorovinyl ether and units of hexafluoropropylene and/or tetrafluoroethylene. The vinylidene fluoride units are present in an amount sufficient to render the polymer an elastomer. Usually, at least about 25% by weight vinylidene fluoride units are needed to obtain a polymer having elastomeric characteristics.

Representative suitable polymers that can be dynamically partially gelled, or polymers that can be blended with dynamically partially gelled polymers, that are used in this invention are composed of about 30–70 weight % vinylidene fluoride units and about 70–30 weight % hexafluoropropylene units (see, e.g., U.S. Pat. No., 3,051,677, granted Aug. 28, 1962 to Rexford). Alternatively, suitable polymers can be composed of about 25–70 weight % vinylidene fluoride units, about 19–60 weight % hexafluoropropylene units, and about 3–35 weight % tetrafluoroethylene units (see, e.g., U.S. Pat. No. 2,968,649, granted Jan. 17, 1961 to Pailthorp and Schroeder). Alternatively, suitable polymers can be composed of about 48–65 weight % vinylidene fluoride units, about 4–15 weight % tetrafluoroethylene units, about 8–23 weight % hexafluoropropylene units and about 17–30 weight % perfluoroalkyl perfluorovinyl ether units wherein the alkyl group contains 1–5 carbon atoms (see, e.g., U.K. Pat. No. 1,496,084, complete specification published Dec. 21, 1977). Alternatively, suitable polymers can be composed of about 10–85 mole % vinylidene fluoride units, about 2–50 mole % of said perfluoroalkyl perfluorovinyl ether units, and about 3–80 mole % of a component consisting of one or more of the following fluorine-containing monomers, hexafluoropropylene units and tetrafluoroethylene units (see, e.g., U.S. Pat. No. 3,235,537 granted Feb. 15, 1966 to Albin and Gallagher). Alternatively, and most preferably, suitable polymers can be composed of up to 3 mole % of units of a bromine-containing olefin, and such brominated monomers can be incorporated into polymers described immediately above (see, e.g., U.S. Pat. No. 4,035,565, granted July 12, 1977 to Apotheker and Krusic). Preferably the fluoroelastomers of this invention that are dynamically partially gelled contain up to 3 mole % of units derived from a bromine-containing olefin, especially 4-bromo-3,3,4,4-tetrafluorobutene-1, and about 30–55 weight % vinylidene fluoride units, 25–40 weight % hexafluoropropylene units and 15–35 weight % tetrafluoroethylene units.

Subsequently, fluoroelastomers of the types described above that are ungelled can be blended with the gelled fluoroelastomers of the present invention so that the resulting blends contain from about 25–55% by weight gel measured in methyl ethyl ketone at 80° C.

The process of the present invention requires that the ungelled fluoroelastomer containing units of vinylidene fluoride and units of at least one other fluorine-containing monomer copolymerizable with vinylidene fluoride, e.g., hexafluoropropylene, is partially gelled while simultaneously mixing and shearing (i.e., dynamically gelling) the fluoroelastomer in an internal mixer in the presence of a small amount of organic peroxide gelling agent. The fluoroelastomer is gelled by heating the mixture to decompose the organic peroxide gelling agent. The amount of peroxide gelling agent and conditions of time and temperature are selected to produce only partial gelling of the polymer, as indicated by a fluoroelastomer having a gel content of from about 15–80% by weight measured in methyl ethyl ketone at 80° C. A peroxide scavenger, such as a phosphite or hindered phenol antioxidant, can be added to prevent the possibility of further gelling of the fluoroelastomer if substantially all the peroxide is not consumed. However, if it is contemplated to subsequently use the gelled fluoroelastomer in a peroxide-cure system, there would be no need to add a scavenger. The resulting partially gelled fluoroelastomer can be processed by conventional techniques used in the rubber industry. The dynamically partially gelled fluoroelastomer can be processed alone or the gelled fluoroelastomer can be blended with ungelled fluoroelastomers of the types described above. In any case the fluoroelastomers can also be mixed with curing systems that are based on organic peroxides, polyamines, and polyols and can be shaped by any suitable means, e.g., especially extrusion procedures.

An essential condition of the process resides in mixing and shearing the fluoroelastomer while, at the same time, the fluoroelastomer is being partially gelled. This is most readily accomplished by mixing the polymer with an organic peroxide gelling agent in an internal mixer. Preferably, the gelling agent is a dialkyl peroxide. Representative gelling agents include 2,5-dimethyl-2,5-di(tertiary butyl peroxy)hexyne-3; 2,5-dimethyl-2,5-di(tertiary butyl peroxy) hexane; dicumyl peroxide; dibenzoyl peroxide; tertiary butyl perbenzoate; di[1,3-dimethyl-3-(t-butyl peroxy)butyl]carbonate.

The amount of organic peroxide used to partially gel the fluoroelastomer will vary, depending upon the fluoroelastomer composition, the particular peroxide selected, the type of coagent used and the percent gel desired to be obtained in the fluoroelastomer. Generally, amounts of organic peroxide gelling agent that are added to the fluoroelastomer are from about 0.5–5%, usually about 1–3%, based on the weight of fluoroelastomer. Such amounts result in fluoroelastomers having gel contents of about 15–80% by weight measured in methyl ethyl ketone at 80° C.

A material which is usually, and preferably, added to the fluoroelastomer before it is partially gelled, is a conventional coagent composed of a polyunsaturated compound which is capable of cooperating with the peroxide gelling agent. This material is added in an amount equal to about 0.5–10%, preferably about 1–7%, by weight of the fluoroelastomer. It is preferred in many applications to use as a coagent one or more of the following compounds: triallyl cyanurate; triallyl isocyanurate; tris(diallylamine)-s-triazine; triallyl phosphite; N,N-diallyl acrylamide; hexaallyl phosphoramide; N,N,N',N'-tetra-allyl terephthalamide; N,N,N'',N''-tetra-allyl malonamide; trivinyl isocyanurate; 2,4,6-trivinyl methyltrisiloxane; tri(5-norbornenemethylene)cyanurate; ethylene/propylene copolymers or ethylene/propylene/diene terpolymers and the like. Ethylene/propylene/nonconjugated diene terpolymers and triallyl isocyanurate are particularly useful.

The fluoroelastomers used in the present invention containing vinylidene fluoride units usually, and preferably, contain at least one metal compound selected from divalent metal oxides and divalent metal hydroxides. A metal of a salt of a weak acid can be used along with the oxide or hydroxide. The metal compound is a commonly used component that is added to fluoroelastomers in amounts of about 1–15%, by weight, preferably about 2–10%, by weight, of the fluoroelastomer for the purpose of assisting cure site generation of double bonds and absorbing hydrogen fluoride generated during subsequent curing.

Conventional fillers, such as carbon black, barium sulfate, calcium carbonate, calcium silicate, magnesium silicate and pigments, such as titanium dioxide, can be added in the usual amounts, e.g., 5–60% by weight of the fluoroelastomer, to the fluoroelastomers during the dynamic gelling process used in the present invention.

The fluoroelastomers used in the present invention are prepared by conventional procedures well known in the art. It is preferred that the reaction mixture of monomer components also contains a free-radical initiator, and the copolymer-forming reaction is carried out as a free-radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example, sodium, potassium and ammonium perphosphates, perborates and percarbonates. The initiator can be used in combination with a reducing agent such as sodium, potassium, or ammonium sulfite, bisulfite, metabisulfite, hyposulfite, or phosphite, or in combination with a ferrous or a cuprous salt, or a salt of other easily oxidized metal compounds. Known organic free-radical initiators can also be used, preferably in combination with a suitable surfactant such as sodium lauryl sulfate or ammonium perfluorooctanoate. The surfactant can be selected from those known to be useful in the manufacture of fluoroelastomers. A suitable known chain transfer agent can also be present, if desired, during the emulsion polymerization reaction.

After completion of the emulsion polymerization reaction, the fluoroelastomer can be isolated from the resulting polymer latex by known methods, for example, adding an electrolyte thereby causing coagulation or by freezing, followed by centrifuging or filtering, and then drying the fluoroelastomer.

During preparation of the fluoroelastomer, the reaction mixture is preferably heated in a reactor which has been flushed with an inert gas at about 50°–130° C. under superatmospheric pressure, for example, under a pressure of about 0.7–13.7 MPa, preferably about 3.4–10.3 MPa. In some of the most useful procedures, the polymerization is carried out as a continuous process and the reaction mixture has an average residence time in the reactor of about 5 to 30 minutes in some cases, and up to 2 or 3 hours in others. Residence time can be calculated by dividing the reactor volume by the volume of latex produced per hour.

The following examples further illustrate the invention. The processing characteristics of dynamically partially gelled fluoroelastomers are compared with similar ungelled fluorelastomers that are outside the scope of the present invention. In the examples, all parts and percentages are by weight unless otherwise indicated.

EXAMPLES

Fluoroelastomer A is composed of, by weight 35.5% vinylidene fluoride units, 33.7% hexafluoropropylene units, 29% tetrafluoroethylene units and 1.8% (0.8 mole %) 4-bromo-3,3,4,4-tetrafluorobutene-1 units.

Fluoroelastomer B is composed of, by weight, 60.7% vinylidene fluoride units and 39.3% hexafluoropropylene units.

Fluoroelastomer C is composed of, by weight, 45% vinylidene fluoride units, 30% hexafluoropropylene units and 25% tetrafluoroethylene units.

The gel content is determined by measuring the material insoluble in MEK as follows: a solution-dispersion of a known concentration (about 1% by weight polymer) in methyl ethyl ketone is placed in a closed centrifuge tube and centrifuged at about 17,000 rpm (Relative Centrifugal Force 34,800×G) for one-half hour. The concentration of polymer in the supernatant liquid is determined by evaporation to dryness of a known volume. The amount of gel polymer is calculated from the difference in concentration of total polymer and concentration of polymer in the soluble portion. For the purposes of this method weights are determined to the nearest 0.0001 g.

The following ASTM test methods were used to determine the physical properties of the fluoroelastomer compositions described in the examples.

Tensile Strength at break, D412-80
Elongation at Break, D412-80
Modulus at 100% elongation, D412-80
Compression Set Resistance, Method B,
(O-rings) D-395-78
Hardness, Durometer A, D2240-75
Mooney Viscosity, D1646-80
Mooney Scorch, D1646-80
Oscillating Disc Rheometer (ODR), D2084-79

The die swell of an extrudate is determined from the following equation:

$$\text{Die Swell (\%)} \ (D_{ext}/D_{die})^2 - 1] \times 100$$

where $D_{ext}$ diameter of the extrudate and $D_{die}$ diameter of the round die opening.

EXAMPLES 1–4

A mixture of ungelled Fluoroelastomer A and ungelled Fluoroelastomer B in the amounts shown in grams in Table I and 4500 grams of ungelled Fluoroelastomer B alone, were added to an internal mixer and mixed and sheared and heated until a temperature of 55°–65° C. was reached. Then sublimed litharge (lead oxide), the coagent triallylisocyanurate, and the peroxide gelling agent 2,5-dimethyl-2,5-bis-(t-butylperoxy)-hexane (Luperco 101-XL) were added to the mixer in the amounts shown in grams in Table I. The fluoroelastomer compositions were simultaneously mixed, sheared and gelled at 70–90 rpm until the temperature of the mixture reached 177° C. Simultaneously mixing and shearing and gelling was continued at a temperature of 177°–188° C. for 5 minutes. The gelled mixed stock was discharged from the internal mixer and put on a two-roll rubber mill and milled into sheet form.

The gel content, Mooney viscosity, Mooney scorch and ODR values of the partially gelled fluoroelastomers were determined and their values are given below in Table I.

TABLE I

| Examples | 1 | 2 | 3 | 4 |
|---|---|---|---|---|
| Fluoroelastomer-A | 3150 | 2700 | 225 | — |
| Fluoroelastomer-B | 1350 | 1800 | 4275 | 4500 |
| Sublimed Litharge | 135 | 135 | 135 | 135 |
| *Diak #7 | 135 | 135 | 135 | 135 |
| **Luperco 101-XL | 135 | 135 | 135 | 135 |
| Stock Properties | | | | |
| Mooney Viscosity, ML10/100° C. | >200 | >200 | 122 | 118 |
| Mooney Scorch, MS/121° C. | | | | |
| Minimum Viscosity | 102 | 85 | 44 | 42 |
| Viscosity Increase in 30 min | 0 | 0 | 0 | 0 |
| ODR - 190° C./12 min (microdie, +/− 1° arc, 100 cpm) ML,N-m (no cure activity for any compound) | 2.4 | 2.2 | 1.7 | 1.7 |
| Gel Content, wt. % | 77 | 72 | 50 | 48 |
| Millable in sheet form | Yes | Yes | Yes | Yes |

*Triallylisocyanurate
**2,5-dimethyl-2,5-bis(5-butyl-peroxy)hexane; 40% active ingredient on inert filler.

Determination of Properties of Gelled Fluoroelastomers of Examples 1-4 and Ungelled Control with Peroxide Cure 750 g samples of the partially peroxide-gelled fluoroelastomers of Examples 1, 2, 3 and 4 (having gel contents of 77%, 72%, 50%, 48%) were each added to 750 g samples of ungelled Fluoroelastomer A in an internal mixer. MT carbon black, sublimed litharge, triallylisocyanurate and Luperco 101-XL were added to the mixer in the amounts shown in grams in Table II. A control experiment was conducted using 1500 g of ungelled Fluoroelastomer A. The fluoroelastomer compositions described above were mixed until the temperature of the stock was 104° C., which is below the curing temperature of the compositions. The compositions were removed from the internal mixer and were sheeted out on a two-roll rubber mill. Portions were cured statically by a conventional two-step process of a press cure followed by a post cure, as described below in Table II. Selected properties of the uncured and cured fluoroelastomer blends are shown in Table II.

TABLE II

| Polymers | Control I | 1 | 2 | 3 | 4 |
|---|---|---|---|---|---|
| Ungelled Fluoroelastomer A | 1500 | 750 | 750 | 750 | 750 |
| Gelled Fluoroelastomer (Ex. 1) | — | 750 | — | — | — |
| Gelled Fluoroelastomer (Ex. 2) | — | — | 750 | — | — |
| Gelled Fluoroelastomer (Ex. 3) | — | — | — | 750 | — |
| Gelled Fluoroelastomer (Ex. 4) | — | — | — | — | 750 |
| MT Carbon Black | 450 | 450 | 450 | 450 | 450 |
| Sublimed Litharge | 45 | 45 | 45 | 45 | 45 |
| Diak #7 | 45 | 30 | 30 | 30 | 30 |
| Luperco 101-XL | 45 | 30 | 30 | 30 | 30 |
| Stock Properties | | | | | |
| Mooney Scorch, MS/121° C. | | | | | |
| Minimum Viscosity | 60 | 88 | 76 | 55 | 53 |
| Time to 5 point Rise, min | 36 | 27 | 30 | 36 | 41 |
| Time to 10 point Rise, min | 36 | 30 | 34 | 43 | 45 |
| *ODR - 190° C./12 min (microdie, +/− 1° arc, 100 cpm) | | | | | |
| ML, N-m | 1.1 | 2.1 | 2.0 | 1.5 | 1.4 |
| $t_s 0.2$, min | 1.1 | 1.3 | 1.3 | 1.4 | 1.4 |
| MH, N-m | 3.7 | 4.0 | 3.9 | 2.9 | 2.8 |
| M'90, N-m | 3.4 | 3.8 | 3.7 | 2.7 | 2.6 |
| t'90, min | 4.1 | 4.9 | 4.9 | 4.9 | 5.1 |
| Vulcanizate Properties | | | | | |
| Press Cured - 190° C./5 min and Post Cured - 232° C./24 hrs. | | | | | |
| Hardness, durometer A | 76 | 79 | 76 | 73 | 72 |
| 100% Modulus, MPa | 7.8 | 8.8 | 8.6 | 5.8 | 5.7 |
| Tensile Strength, MPa | 20.3 | 16.2 | 14.4 | 11.9 | 11.6 |
| Elongation, % | 195 | 165 | 150 | 190 | 190 |
| Compression Set Resistance, Method B (O-rings), % 200° C./70 hr | 43 | 40 | 43 | 49 | 51 |

*ML is minimum torque
$t_s 0.2$ is time for torque to increase 0.2 N.m above ML
MH is maximum torque
M'90 is 0.90 (MH-ML)+ML
t'90 min is time for torque to increase to M'90

The stock properties of the gelled and ungelled fluoroelastomer compositions and the vulcanizate properties of the cured fluoroelastomer compositions shown in Table II are satisfactory and do not differ substantially.

Extrusion Behavior of Gelled Fluoroelastomers of Examples 1-4 and Ungelled Control The extrusion behavior of the uncured ungelled fluoroelastomer used in the control experiment and the uncured gelled fluoroelastomer compositions of Examples 1-4 were evaluated on a capillary rheometer using a round die with a diameter of 1.50 mm and a length-/diameter ratio of 1/1 at a temperature of 90° C. The test results show that the addition of the millable partially gelled fluoroelastomers to the ungelled fluoroelastomer resulted in compositions whose processing behavior was substantially improved over the ungelled fluoroelastomer composition. When the partially gelled compositions of the present invention were compared with the ungelled fluoroelastomer used in the control experiment the die swell was substantially reduced, and the extrudate surface were smoother having a better appearance, as shown in Table III.

TABLE III

| | Control I | | | | 1 | | | 2 | | |
|---|---|---|---|---|---|---|---|---|---|---|
| Shear Rate (l/s) | Die Pressure (MPa) | Die Swell (%) | Extrudate Surface | | Die Pressure (MPa) | Die Swell (%) | Extrudate Surface | Die Pressure (MPa) | Die Swell (%) | Extrudate Surface |
| 182 | 16.1 | 148 | N | | 18.8 | 74 | M | 18.5 | 76 | M |
| 363 | 24.9 | 198 | vN | | 27.0 | 95 | M | 26.8 | 97 | M |
| 727 | 49.0 | 272 | vN | | 46.1 | 127 | M | 46.7 | 137 | M |
| 1817 | 79.4 | 319 | vvN | | 81.7 | 127 | M | 80.5 | 137 | M |

| | 3 | | | 4 | | |
|---|---|---|---|---|---|---|
| Shear Rate (l/s) | Die Pressure (MPa) | Die Swell (%) | Extrudate Surface | Die Pressure (MPa) | Die Swell (%) | Extrudate Surface |
| 182 | 16.6 | 102 | M | 15.6 | 124 | M |

TABLE III-continued

| | | | | | | |
|---|---|---|---|---|---|---|
| 363 | 24.5 | 132 | sN | 21.8 | 129 | sN |
| 727 | 40.7 | 158 | sN | 36.8 | 142 | sN |
| 1817 | 74.3 | 198 | N | 70.6 | 198 | N |

Die Swell - equilibrium die swell based on a cross-sectional area.
Extrudate Surface:
M — smooth, matted surface;
N — nervy surface;
s — slight;
v — very;

Determination of Properties of Gelled Fluoroelastomers of Examples 1-2 and Ungelled Control with Polyol Cure 750 g samples of the partially peroxide-gelled fluoroelastomers of Examples 1 and 2 (having gel contents of 77% and 72%) were each added to 750 g samples of ungelled Fluoroelastomer B in an internal mixer. MT carbon black, magnesium oxide, calcium hydroxide, the curing accelerator, benzyltriphenylphosphonium chloride, and the crosslinking agent, bisphenol AF, were added to the mixer in amounts shown in grams in Table IV. A Control experiment was conducted using 1500 g of ungelled Fluoroelastomer B. All the compositions were mixed in the internal mixer until the temperature of the stock was 104° C., which is below the curing temperature of the compositions. The compositions were removed from the internal mixer and were sheeted out on a two-roll rubber mill. Portions were cured statically by a two-step process of a press cure followed by a post cure, as described below in Table IV. Selected properties of the uncured and cured fluoroelastomer compositions are shown in Table IV.

TABLE IV

| | Control II | 1 | 2 |
|---|---|---|---|
| Ungelled Fluoroelastomer-B | 1500 | 750 | 750 |
| Gelled Fluoroelastomer Blend- (Ex. 1) | — | 750 | — |
| Gelled Fluoroelastomer Blend- (Ex. 2) | — | — | 750 |
| MT Carbon Black | 450 | 450 | 450 |
| *Maglite D | 45 | 45 | 45 |
| Calcium Hydroxide | 90 | 90 | 90 |
| **BTPPC | 9.0 | 5.9 | 6.3 |
| ***BPAF | 30.0 | 19.5 | 21.0 |
| Stock Properties | | | |
| Mooney Scorch, MS/121° C. Minimum Viscosity | 40 | 73 | 66 |
| Time to 10 point Rise, min | >45 | >45 | >45 |
| ODR - 190° C./12 min (microdie, +/− 1° arc, 100 cps) | | | |
| ML, N-m | 0.8 | 1.5 | 1.5 |
| $t_s$0.2, min | 2.0 | 3.0 | 2.3 |
| MH, N-m | 5.0 | 4.6 | 4.8 |
| M'90, N-m | 4.6 | 4.3 | 4.4 |
| t'90, min | 3.8 | 8.2 | 6.0 |
| Vulcanizate Properties | | | |
| Press Cure - 190° C./10 min and Post Cure - 232°C./24 hrs. | | | |
| Hardness, durometer A | 74 | 80 | 80 |
| 100% Modulus, MPa | 6.1 | 8.1 | 8.5 |
| Tensile Strength, MPa | 11.7 | 12.7 | 13.1 |
| Elongation, % | 175 | 160 | 155 |

*Maglite D: High Activity MgO
**BTPPC: Benzyltriphenylphosphonium chloride
***BPAF: Hexafluoroisopropylidene-bis(4-hydroxybenzene) (Bisphenol AF)

The stock properties of the gelled and ungelled fluoroelastomer compositions and the vulcanizate properties of the cured fluoroelastomer compositions shown in Table IV are satisfactory and do not differ substantially.

Extrusion Behavior of Gelled Fluoroelastomers of Examples 1-2 and Ungelled Control The extrusion behavior of these compositions was evaluated on a capillary rheometer using a round die with a diameter of 1.50 mm and a length/diameter ratio of 1/1 at a temperature of 90° C. The test results show that the addition of the millable partially gelled fluoroelastomers to the ungelled fluoroelastomer resulted in compositions whose processing behavior was substantially improved over the ungelled fluoroelastomer composition of the Control experiment. When partially gelled compositions of the present invention were compared with the ungelled fluoroelastomers used in the control experiment, the die swell was substantially reduced and the extrudate surfaces were smoother having a better appearance, as shown in Table V.

TABLE V

| | Control II | | | 1 | | | 2 | | |
|---|---|---|---|---|---|---|---|---|---|
| Shear Rate (1/s) | Die Pressure (MPa) | Die Swell (%) | Extrudate Surface | Die Pressure (MPa) | Die Swell (%) | Extrudate Surface | Die Pressure (MPa) | Die Swell (%) | Extrudate Surface |
| 182 | 17.3 | 198 | vN | 18.6 | 81 | M | 16.4 | 93 | M |
| 363 | 28.3 | 253 | vvN | 24.8 | 97 | M | 20.7 | 93 | M |
| 727 | 47.1 | 295 | vvN | 37.8 | 122 | M | 30.6 | 112 | M |
| 1817 | 76.6 | 376 | vvN | 67.4 | 142 | vsN | 61.5 | 142 | vsN |

Die Swell - equilibrium die swell based on the cross-sectional area.
Extrudate Surface:
M — smooth, matted surface;
N — nervy surface;
s — slight;
v — very.

EXAMPLES 5-7

A mixture of ungelled Fluoroelastomer A and ungelled Fluoroelastomer B in the amounts shown in grams in Table VI were added to an internal mixer and mixed and sheared and heated until a temperature of 55–65° C. was reached. Then sublimed litharge (lead oxide), the coagent triallylisocyanurate, and the peroxide gelling agent 2,5-dimethyl-2,5-bis-(t-butylperoxy)-hexane (Luperco 101-XL) were added to the mixer in the amounts shown in grams in Table VI. The fluoroelastomers were simultaneously mixed and sheared and gelled at 70-90 rpm until the temperature of the mixture reached 177° C. Simultaneous mixing and shearing and gelling was continued at a temperature of 177°-188° C. for 5 minutes. The gelled mixed stock was discharged from the internal mixer and put on a two-roll rubber mill and milled into sheet form.

The gel content, Mooney viscosity, Mooney scorch and ODR values of the partially gelled fluoroelastomers were determined and their values are given below in Table VI.

TABLE VI

| Examples | 5 | 6 | 7 |
|---|---|---|---|
| Fluoroelastomer-A | 1800 | 1350 | 900 |
| Fluoroelastomer-B | 2700 | 3150 | 3600 |
| Sublimed Litharge | 135 | 135 | 135 |
| *Diak #7 | 135 | 135 | 135 |
| **Luperco 101-XL | 135 | 135 | 135 |
| Stock Properties | | | |
| Mooney Viscosity, ML10/100° C. | >200 | >200 | >200 |
| Mooney Scorch, MS/121° C. | | | |
| Minimum Viscosity | 64 | 57 | 56 |
| Viscosity Increase in 30 min | 0 | 0 | 0 |
| ODR - 190° C./12 min (microdie, +/− 1° arc, 100 cpm) | | | |
| ML, N-m (no cure activity for any compound) | 2.1 | 1.9 | 1.9 |
| Gel Content, wt. % | 63 | 58 | 56 |
| Millable in sheet form | Yes | Yes | Yes |

*Triallylisocyanurate
**2,5-dimethyl-2,5-bis(5-butylperoxy)hexane; 40% active ingredient on inert filler.

Determination of Properties of Gelled Fluoroelastomers of Examples 5-7 and Ungelled Control with Polyol Cure 1500 g samples of the partially peroxide-gelled fluoroelastomers of Examples 5, 6 and 7 (having gel contents of 63%, 58% and 56%) were each added to an internal mixer and mixed with MT carbon black, Maglite D, calcium hydroxide, the curing accelerator, benzytriphenylphosphonium chloride and bisphenol AF in the amounts shown in grams in Table VII. A control experiment was conducted using 1500 g of ungelled Fluoroelastomer B. The fluoroelastomer compositions described above were mixed until the temperature of the stock was 104° C., which is below the curing temperature of the compositions. The compositions were removed from the internal mixer and were sheeted out on a two-roll rubber mill. Portions were cured statically by a conventional two-step process of a press cure followed by a post cure, as described below in Table VII. Selected properties of the uncured and cured fluoroelastomer blends are shown in Table VII.

TABLE VII

| Polymers | Control III | 5 | 6 | 7 |
|---|---|---|---|---|
| Ungelled Fluoroelastomer B | 1500 | — | — | — |
| Gelled Fluoroelastomer (Ex. 5) | — | 1500 | — | — |
| Gelled Fluoroelastomer (Ex. 6) | — | — | 1500 | — |
| Gelled Fluoroelastomer (Ex. 7) | — | — | — | 1500 |
| MT Carbon Black | 450 | 450 | 450 | 450 |
| *Maglite D | 45 | 45 | 45 | 45 |
| Calcium Hydroxide | 90 | 90 | 90 | 90 |
| **BTPPC | 9.0 | 5.4 | 6.3 | 7.2 |
| ***BPAF | 30.0 | 18.0 | 21.0 | 24.0 |
| Stock Properties | | | | |
| Mooney Scorch, MS/121° C. | | | | |
| Minimum Viscosity | 39 | 87 | 74 | 75 |
| Viscosity Increase in 30 min | 6 | 5 | 4 | 8 |
| ODR - 190° C./12 min (microdie, +/− 1° arc, 100 cpm) | | | | |
| ML, N-m | 1.0 | 2.3 | 1.8 | 1.8 |
| t$_s$0.2, min | 1.8 | 2.0 | 2.2 | 1.7 |
| MH, N-m | 5.5 | 5.2 | 4.4 | 5.8 |
| M'90, N-m | 5.0 | 4.9 | 4.1 | 5.4 |
| t'90, min | 3.2 | 5.6 | 5.7 | 3.5 |
| Vulcanizate Properties | | | | |
| Press Cured - 190° C./5 min and Post Cured - 232° C./24 hrs. | | | | |
| Hardness, durometer A | 73 | 83 | 76 | 81 |
| 100% Modulus, MPa | 6.5 | 11.6 | 8.6 | 12.4 |
| Tensile Strength, MPa | 13.2 | 13.5 | 14.5 | 14.3 |
| Elongation, % | 185 | 120 | 165 | 115 |

*Maglite D; High Activity MgO
**BTPPC: Benzyltriphenylphosphonium chloride
***BPAF: Hexafluoroisopropylidene-bis(4-hydroxybenzene) (Bisphenol AF)

The stock properties of the gelled and ungelled fluoroelastomer compositions and the vulcanizate properties of the cured fluoroelastomer compositions shown in Table VII are satisfactory and do not differ substantially.

Extrusion Behavior of Gelled Fluoroelastomers of Examples 5-7 and Ungelled Control The extrusion behavior of the uncured ungelled fluoroelastomer used in the control experiment and the uncured gelled fluoroelastomer compositions of Examples 5-7 were evaluated on a capillary rheometer using a round die with a diameter of 1.50 mm and a length/diameter ratio of 1/1 at a temperature of 90° C. The test results show that the processing behavior of the gelled fluoroelastomer compositions was substantially improved over the ungelled fluoroelastomer composition. When the gelled compositions of the present invention were compared with the ungelled fluoroelastomer used in the control experiment the die swell was substantially reduced and the extrudate surfaces were smoother having a better appearance, as shown in Table VIII.

TABLE VIII

| | Control III | | | 5 | | | 6 | | | 7 | | |
|---|---|---|---|---|---|---|---|---|---|---|---|---|
| Shear Rate (l/s) | Die Pressure (MPa) | Die Swell (%) | Extrudate Surface | Die Pressure (MPa) | Die Swell (%) | Extrudate Surface | Die Pressure (MPa) | Die Swell (%) | Extrudate Surface | Die Pressure (MPa) | Die Swell (%) | Extrudate Surface |
| 182 | 13.5 | 100 | sN | 19.9 | 50 | M | 18.6 | 57 | M | 18.5 | 57 | M |
| 363 | 18.3 | 222 | N | 23.6 | 61 | M | 21.7 | 74 | M | 21.8 | 68 | M |
| 727 | 32.1 | 292 | vN | 28.8 | 70 | M | 26.9 | 93 | M | 27.1 | 83 | M |

TABLE VIII-continued

| | Control III | | | 5 | | | 6 | | | 7 | | |
|---|---|---|---|---|---|---|---|---|---|---|---|---|
| Shear Rate (1/s) | Die Pressure (MPa) | Die Swell (%) | Extrudate Surface | Die Pressure (MPa) | Die Swell (%) | Extrudate Surface | Die Pressure (MPa) | Die Swell (%) | Extrudate Surface | Die Pressure (MPa) | Die Swell (%) | Extrudate Surface |
| 1817 | 69.9 | 391 | vvN | 44.8 | 93 | M | 44.0 | 119 | M | 43.0 | 107 | M |

Die Swell - equilibrium die swell based on a cross-sectional area.
Extrudate Surface:
M — smooth, matted surface;
N — nervy surface;
s — slight;
v — very;

EXAMPLE 8

4400 grams of Fluoroelastomer C were added to an internal mixer and mixed and sheared and heated until a temperature of 55-65° C. was reached. Then sublimed litharge (lead oxide), the coagent triallylisocyanurate, and the peroxide gelling agent 2,5-dimethyl-2,5-bis-(t-butylperoxy)hexane (Luperco 101 XL) were added to the mixer in the amounts shown in grams in Table IX. The fluoroelastomer was simultaneously mixed and sheared and gelled at 70-90 rpm until the temperature of the mixture reached 177° C. Simultaneous mixing and shearing and gelling was continued at a temperature of 177-188° C. for 5 minutes. The gelled stock was discharged from the internal mixer and put on a two-roll rubber mill and milled into sheet form.

The gel content, Mooney viscosity, Mooney scorch and ODR values of the partially gelled fluoroelastomer were determined and their values are given below in Table IX.

TABLE IX

| | |
|---|---|
| Fluoroelastomer C | 4400 |
| Sublimed Litharge | 132 |
| *Diak #7 | 132 |
| **Luperco 101-XL | 132 |
| Stock Properties | |
| Mooney viscosity, ML 10/100° C. | >200 |
| Mooney Scorch, MS/121° C. | |
| Minimum viscosity | 56 |
| Viscosity Increase in 30 minutes | 0 |
| ODR-190° C./12 minutes (Microdie, +1—1° arc, 100 cpm) | |
| ML, N-m | 1.9 |
| Gel content, wt. % | 28.7 |

*Triallylisocyanurate
**2,5-dimethyl-2,5-bis(5-butylperoxy)hexane; 40% active ingredient on inert filler Extrusion Behavior of Gelled Fluoroelastomer of Example 8 and Ungelled Control 700 grams of uncured ungelled Fluoroelastomer C used in a control experiment and 700 grams of the uncured gelled fluoroelastomer composition of Example 8 were each mixed with 210 grams of MT Carbon Black and their extrusion behavior evaluated on a capillary rheometer using a round die with a diameter of 1.50 mm and a length/diameter ratio of 1/1 at a temperature of 90° C. The test results show that the processing behavior of the gelled elastomer composition of the present invention was substantially improved over the ungelled fluoroelastomer composition. When the gelled composition was compared with the ungelled fluoroelastomer used in the control experiment the die swell was substantially reduced, as shown in Table X.

TABLE X

| Control IV | | 8 | |
|---|---|---|---|
| Shear Rate (1/s) | Die Swell (%) | Shear Rate (1/s) | Die Swell (%) |
| 727 | 192 | 727 | 145 |
| 1817 | 292 | 1817 | 175 |

I claim:

1. A process for the manufacture of a processable gelled fluoroelastomer which comprises simultaneously mixing, shearing and gelling, in an internal mixer, a fluoroelastomer comprising interpolymerized units of vinylidene fluoride and units of at least one other fluorine-containing monomer copolymerizable with vinylidene fluoride, said monomer containing from 2-7 carbon atoms, containing no bromine atoms and containing at least as many fluorine atoms as carbon atoms, in the presence of an organic peroxide gelling agent for the fluoroelastomer for a time and at a temperature sufficient to decompose the peroxide gelling agent, said peroxide gelling agent added to the fluoroelastomer in an amount to gel the fluoroelastomer to a gel content of from about 15-80% by weight, measured in methyl ethyl ketone at 80° C., and recovering the gelled fluoroelastomer.

2. A process of claim 1 wherein sufficient peroxide is added to the fluoroelastomer to obtain a gel content of from about 25-75% by weight.

3. A process of claim 1 wherein a blend of fluoroelastomers is added to the internal mixer wherein the fluoroelastomers of the blend comprise units of vinylidene fluoride and hexafluoropropylene and at least one fluoroelastomer of the blend contains units from a bromine-containing olefin.

4. A process of claim 1 wherein a blend of fluoroelastomers is added to the internal mixer wherein the fluoroelastomers of the blend comprise units of vinylidene fluoride and hexafluoropropylene and at least one fluoroelastomer of the blend contains tetrafluoroethylene units and units from a bromine-containing olefin.

5. A process according to claim 4 wherein units of the bromine-containing olefin are from 4-bromo-3,3,4,4-tetrafluorobutene-1.

6. A process of claim 4 wherein sufficient peroxide is added to the fluoroelastomer to obtain a gel content of from 25-75% by weight.

* * * * *